May 5, 1959
M. A. MOSKOVITZ
2,885,235
BALL JOINT ASSEMBLY
Filed Nov. 29, 1955
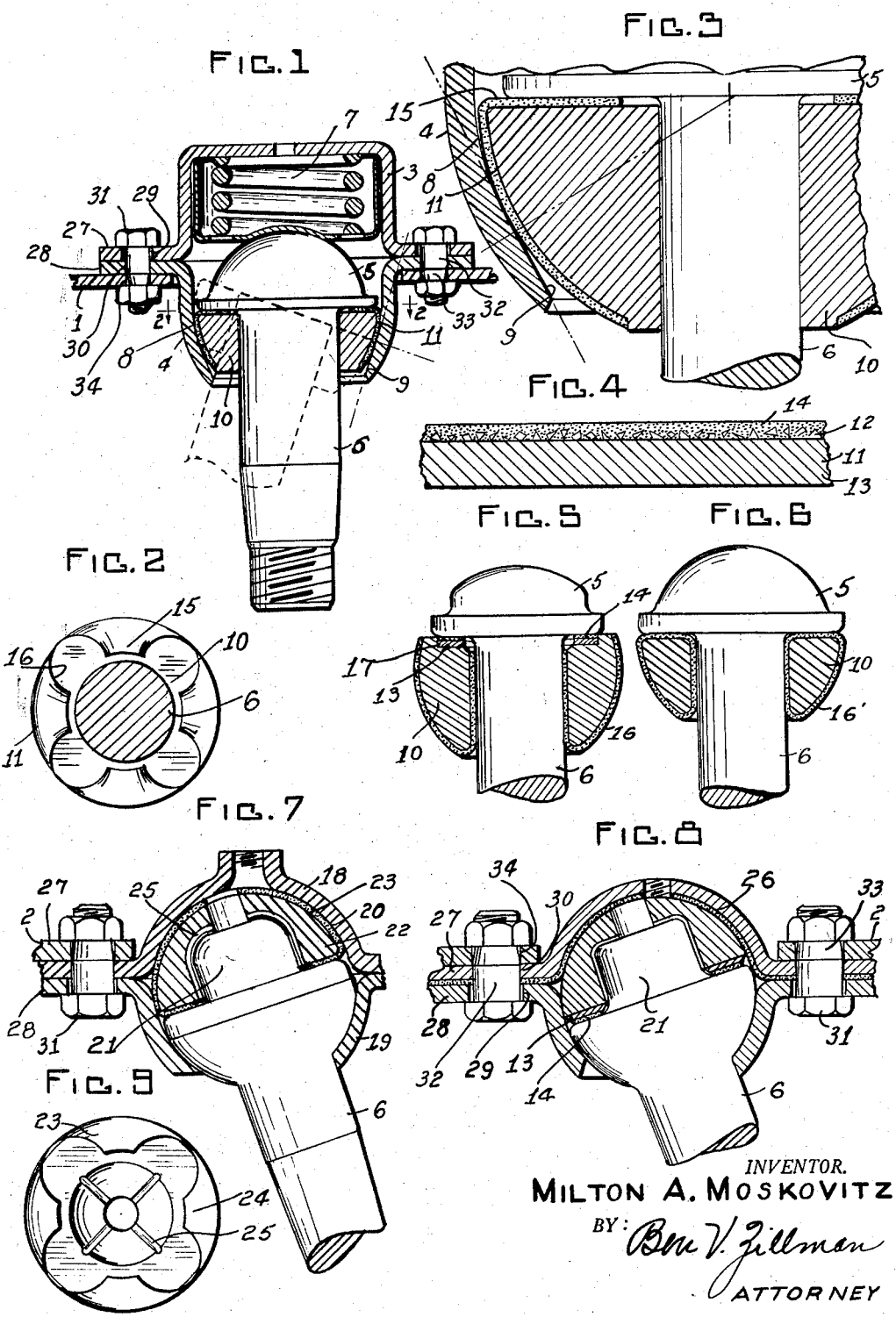
INVENTOR.
MILTON A. MOSKOVITZ
BY:
ATTORNEY United States Patent Office 2,885,235
Patented May 5, 1959

2,885,235
BALL JOINT ASSEMBLY
Milton A. Moskovitz, Richmond Heights, Mo., assignor of one-half to Harry Frankel, St. Louis, Mo.
Application November 29, 1955, Serial No. 549,693
3 Claims. (Cl. 287—87)

This invention relates to a ball joint assembly of the type that is especially adapted in interconnecting two relatively movable parts of a motor vehicle, as for instance in a part of the steering or wheel suspension mechanism of the same.

The current trend in motor vehicle design is to so reduce the number of grease fittings to a minimum that necessity for replacement of lubricant to the same is obviated, and the principal object of this invention is to so construct a joint of the kind described, not requiring lubricant replacement at all, or possibly at rare and infrequent intervals, for use at the independently steerable front wheel suspension, and which is substantially permanently initially assembled as a completed unit ready for installation as is, at said parts.

One of the more important objects of my invention is to so construct such a joint that its bearing will employ a sheath that is made of various materials permanently associated with one another, one of the components materials of the same being a plastic that has a rather poor mechanical strength and an extremely low coefficient of friction, and backing this weak material with an extremely sturdy metal that is well able to take hard usage, so combining utmost ease of steering and riding with strength and safety.

Another object of the invention is to so construct such a bearing sheath that it may be easily and securely interlocked with the suitable base or core on which it may be mounted.

A further object of my invention is to provide a bearing unit of the kind described, with initially formed spaced-apart ears thereon that are then bent into superimposement on the base element or core, such as a bushing, to securely interlock with the latter, and shaping said ears that they have arcuate bounding walls to provide pockets between the ears to entrap lubricant and cause the lubricant to swirl about as relative rotational movement occurs between the adjacent cooperating members.

An added object of the invention is to construct the casing of the joint with an internal concave bearing surface intended to cooperate with an approximately convex complemental bearing surface of a bushing, but with said concave bearing surface terminating short of the end of said casing and thence continuing substantially flared, said flare being substantially on a tangent to said concave bearing surface from the terminus of the latter.

A still further object of my invention is to provide novel means of interconnection between the casing parts of the joint, completing this connection at the initial assembly of the joint, to thereby not only hold the parts of the joint together in assembled relationship, but permit of easy and certain centering of the joint on the cooperating supporting member with which it is to be associated, such as the plate or control arm of the vehicle.

Many other objects and advantages of the construction herein shown and described, and the uses and advantages thereby obtained, will be obvious to those skilled in the art to which this invention appertains, as will be apparent from the disclosures hereinafter given.

To this end, my invention consists in the novel form, arrangement, construction and combination herein shown and described, and as will be more clearly pointed out in the claims hereinafter appended.

In the drawings, wherein like reference characters represent like or corresponding parts throughout the views, Figure 1 is a vertical cross-sectional view through a joint, showing a fragment of the control arm to which it is connected;

Figure 2 is a horizontal cross-section taken through the same, substantially along the line 2—2 of Fig. 1;

Figure 3 is an enlarged detail showing the bearing relation between the relatively movable elements, as initially assembled;

Figure 4 is a highly magnified cross-section through the thickness of the composite bearing element shown in Figs. 1–9 inclusive;

Figures 5 and 6 are details of modified forms of joints, with the casing parts omitted;

Figures 7 and 8 are cross-sectional views of additional forms of joints; and

Figure 9 is a plan view of the bushing shown in Fig. 7, having its sheath secured thereto, as viewed from the planar end of the bushing.

Referring more particularly to the drawings, wherein I have illustrated the preferred embodiments of my invention, there is shown joints of the ball and socket type especially intended for interconnection between the front wheel steering knuckle and the control arms of the vehicle, the joints shown in Figs. 1–6 inclusive interconnecting with the upper control arm 1 for stabilizing the upper end of the steering knuckle, while the joints shown in Figs. 7–9 inclusive are intended for interconnection between said knuckle and the lower control arm 2 of the vehicle, these joints being initially completely assembled prior to their installation on the motor vehicle, thus obviating any disturbing of said assembled relationship when installing them on the vehicle.

In the forms shown in Figs. 1–6 inclusive there is a housing or casing composed of a pair of opposed hollow mating shells 3 and 4 to together provide a chamber therebetween open at one end, as for instance at the lower end as shown.

A steel stud, provided with a rounded or convex radially enlarged head 5 and an axially extending shank 6 is rotatably and tiltably movable within said casing, with the shank projecting outwardly through the open end of the casing, and suitable resiliently yieldable pressure means 7 is mounted within the casing so as to constantly urge said stud outwardly through said casing.

The lower shell 4 is formed with an internal concave bearing surface 8 therein, but it is to be particularly noted that this spherically rounded portion terminates at a point that is spaced inwardly or rearwardly of said open end of the casing, and from that point outwardly to said open end the chamber bounding wall continues as a flared or tapered conical surface 9, with the angle of taper being substantially tangent to the concave bearing surface as indicated in dotted lines in Figs. 1 and 3.

A bushing is interposed between the stud and the shell bearing surface to engage the latter as relative movement occurs between the parts, and in the forms shown in Figs. 1–6 inclusive, the bushing is bored to receive the stud shank and has a convex exterior that is approximately concentric or parallel to the concave bearing surface of the casing.

As a great deal of friction between the movable parts is apt to occur during use of the vehicle, I have so combined various materials to make for a minimum of friction between the actual bearing parts of the joint, and yet secure the requisite mechanical strength.

Therefore, only the core 10 of the bushing is made of a strong and sturdy material, such as of steel, that is well able to withstand shocks and the load and to rapidly dissipate heat from the cooperating bearing parts, the convex exterior of this core being of such size and shape and sufficiently small radius as to be spaced from the opposed concave bearing surface of the casing, the top of this core being substantially planar, and in the forms shown in Figs. 1–4, said planar face is spaced from the correspondingly planar face of the under side of the stud head.

An anti-friction sheath 11 is interposed between the rounded face of said bushing core and the opposed bearing surface of the casing, and is secured to said core so as to have its exterior slidably engage said casing bearing face.

This exterior surface of the sheath is made of a material that has an extremely low coefficient of friction, as for example, of a plastic or plastic-impregnated material such as nylon, polytetrafluorethylene or fluorocarbon resin, etc.

Inasmuch as this fluorocarbon resin by itself is limited in its use as an anti-friction material, to light loads and low speeds due to its poor thermal conductivity, poor temperature stability as compared with metals, high coefficient of thermal expansion, tendency to cold flow and its elastic memory, I have combined this resin physically with other material into a composite integral unit sheath that will carry off the heat generated during service and provide support and give dimensional stability that is lacking in the resin itself.

I therefore make the composite sheath by applying a matrix or layer of a substantially porous material such as bronze powder 12 to the surface of a steel backing sheet 13, then sintering said powder in a reducing atmosphere to bond it to said backing sheet. The porous bronze surface of the resulting bi-metallic strip is then impregnated with the fluorocarbon resin 14, with the application of heat and pressure, using sufficient resin to fill the voids of the bronze and mechanically interlock said matrix and preferably project sufficiently above the latter to provide a thin layer of the pure resin.

Although the sheath thus produced could be used dry, it is preferable that liquid lubricant be used in most cases, as this increases the rate of heat dissipation and permits more severe operating conditions. The matrix is only a few thousandths of an inch thick, and the resin is not much thicker, projecting perhaps a few thousandths of an inch therebeyond, while the steel backing is many times thicker than the combined thicknesses of the bronze and resin, say at least $\frac{1}{16}''$, to afford proper strength to the sheath.

The composite sheath thus produced, although it may be initially flat, may then be shaped as required, and in Figs. 1–3 is shown wrapped about the convex exterior of the bushing core to tightly hug the same, its upper end having circumferentially spaced-apart upstanding ears 15 with arcuate bounding edges therebetween, so that the ears may be bent flat onto the planar end of the bushing core and extend to adjacent the stud shank (as shown in Fig. 2).

Now, when relative rotation occurs between the stud and the bushing as thus sheathed, the approximately circular pockets thus formed between the adjacent ears will cause the lubricant entrapped therein to swirl and propel the lubricant toward the shank and along the opposed under face of the stud head.

In the form shown in Figs. 1–6 inclusive, it is preferable that the bushing and tangential surface of the chamber have such a relationship that when the stud has been moved to its limit of tilt in one direction as indicated in dotted lines in Fig. 1, and with the one side of the bushing then being tilted upwardly, the opposed convex face of the bushing sheath will bear on the chamber wall at approximately the innermost beginning of tangency or flare.

Another advantage thus obtained by providing such a tangentially flared end for the chamber is that a relative movement between the bushing and chamber wall, especially at tilt of said stud, will cause lubricant clinging to the bushing surface, in the flared portion of the chamber, to be carried upwardly and inwardly into the casing and afford excellent lubrication of cooperating wear surfaces.

Although it may sometimes be desirable that the surfaces of the bushing and chamber be of exactly the same curvature so as to make them truly complemental, yet actual manufacturing methods will not readily permit of so doing, on account of extremely high labor costs involved, and further, such a tight fit does not permit of proper lubricant movement between the opposed bearing surfaces, so that in practice manufacturing tolerances are set up whereby a few thousandths of an inch plus or minus in size is permitted, so that when the joint parts are initially assembled, this slight difference in sizes makes the bushing drop slightly in the casing shell and come to rest at the terminus of concavity of the shell and at start of the tangency or flare, as indicated in the Fig. 3 enlarged detail view, showing a gradually increasing lateral clearance between the sheath and the opposed casing wall surface. Now, as some wear occurs between said bearing parts, the shell surface will wear faster than the sheath, to thereby permit an increase of bearing area actually in contact, and with a reduction in lateral clearance from that shown.

In Fig. 5, the sheath 16 envelopes the shank-receiving portion of the bushing core as well as being superimposed to cover the convex exterior of the latter, thus reducing the wear of said shank, while in Fig. 6, the sheath 16' completely encloses the bushing core.

In addition, a separate sheath, in the form of a ring or washer 17, having the relatively thin plastic coating with a relatively thicker steel backing strip, as previously described, may be interposed between said bushing core and under side or radial flange of the stud head, as indicated in Fig. 5, so that said resin face will be complemental to the planar face of said stud head with a minimum of friction therebetween, while the steel face will be rotatable on said bushing core, whereby the greater frictional contact between the said core and ring will permit the easy rotation between the stud and bushing, and with a tendency of the ring to rotate together with the bushing.

In the modification shown in Fig. 7, the hollow casing comprises a pair of hollow chambered mating shells 18—19 having a substantially spherical inner wall, one of the shells provided with a concave bearing surface 20 to engagingly cooperate with the sheathed bushing. Here, the stud has an axially projecting portion 21, extending beyond the stud head in a direction opposite to that of the stud shank, this projecting portion receiving the bored bushing core 22 rotatably thereon. A sheath 23 as previously made up, is wrapped onto said convex core of the bushing to approximately be complemental to said bearing surface 20, this sheath preferably having the upstanding circumferentially spaced-apart ears 24 having the arcuately shaped openings therebetween to form the lubricant-holding pockets as previously set forth, and for the same purpose, after said ears are bent down into superimposement with the planar end of the bushing core (see Figs. 9 and 7). If desired, additional lubricant passages 25 may be provided in the bushing to permit ready travel of lubricant therealong as indicated.

In the modification shown in Fig. 8 the stud is substantially like that shown in Fig. 7, and the bushing core itself is not sheathed, but instead, a sheath 26 is secured to the concave bounding wall of one of the casing shells to form a liner for the latter, and in this case a ring or washer substantially like that shown in Fig. 5 and for a like purpose, is interposed between the planar ends of the bushing and stud head, so that here too, there is more tendency for the washer to rotate with the bushing than with the stud.

In the several forms of joint shown, the casing sections are initially interlocked into an assembly to securely hold them together as a complete unit with the movable parts contained therein, thereby permitting such a joint unit to be handled without likelihood of loss of parts or of alteration of desired relationship, and installed without disturbing said relationship onto the control arm or the like.

To this purpose, the casing shells may be provided with opposed radially extending flanges 27—28. At suitably circumferentially spaced-apart intervals bolt holes 29 may be provided through one of the pair of mating flanges, and at like intervals bolt holes 30 may be provided through the other of the pair of flanges, these bolt holes 29—30 being in registry somewhat as indicated, but with the holes of one set, as for instance the holes 29 being of larger diameter than those of the other set of holes 30. A bolt having a radially enlarged head 31 with a shank portion 32 extending therefrom and with a decreasingly tapered tip portion 33 extending from the main shank portion 32, is passed through each pair of registered bolt holes, said shank portion 32 being smaller than the holes 29 to pass easily therethrough, but requiring being driven through the holes 30 to force-fit with the latter, the length of said shank portion 32 being approximately equal to the combined axial length of the holes 29 and 30. Thus, the joint unit is positively maintained in its initially assembled relationship after said bolts have been driven in place.

Now, when it is desired to install the joint unit on the control arm, this is easily and conveniently accomplished, inasmuch as the reducingly tapered bolt tips may be readily passed through the properly located bolt holes 34 of the control arm, said holes being substantially of the same diameter as the holes 30, whereby the bolts held on the joint unit will be substantially self-centering in the said holes 34, with the largest diameter of said tip of the shank substantially filling said hole area 34.

Having thus described my invention it is obvious that various immaterial changes may be made in the same without departing from the spirit of the invention; hence I do not wish to be understood as limiting myself to the exact form, arrangement, construction and combination herein set forth, except as limited by the claims herein appended and the state of the art to which this invention appertains.

What I claim as new and desire to secure by Letters Patent is:

1. In a ball and socket joint, a casing having a stud rotatable and tiltable therein, said casing having an axially extending chamber therethrough that is reduced transversely across one end and is provided with a concave bearing surface toward said reduced end, a bushing encircling the shank of said stud and having a convex exterior surface having approximately the same center of curvature as that of said bearing surface, said concave bearing surface terminating at a point that is axially inwardly of said reduced end and is formed with a decreasingly tapered wall surface commencing from and being tangential to said terminus, whereby said bushing may have its radius of curvature smaller than that of said concave bearing surface to be supported on said tapered surface.

2. In a ball and socket type joint, a casing having a stud rotatable and tiltable therein and provided with a chamber axially therethrough, said chamber reduced toward one end and provided with a concave bearing surface adjacent said end, a bushing bored to receive the shank on said stud so as to tiltably and rotatably move in said chamber in all directions of stud tilt, said bushing having a convex exterior surface of approximately the same curvature as that of said concave bearing surface, the concave bearing surface terminating at a point that is axially inwardly of the reduced end of said casing and is thence tangentially convergingly flared, thickness of the casing extending decreasingly tapered outwardly to its end.

3. In a ball and socket joint, a casing having a stud rotatable and tiltable therein, said casing having an axially extending chamber therein that is reduced transversely across one end and is provided with a concave interior surface, a bushing carried by said stud and having a convex exterior surface opposed to said concave surface, said concave surface terminating at a point that is axially inwardly of said reduced end and then continues with a convergingly tapered wall bearing surface that is substantially tangential to said convex exterior surface of said bushing, said bushing being supportable on said tapered bearing surface.

References Cited in the file of this patent

UNITED STATES PATENTS

| | | |
|---|---|---|
| 1,332,760 | Saitta | Mar. 2, 1920 |
| 1,401,075 | Harting | Dec. 20, 1921 |
| 1,544,263 | Montgomery | June 20, 1925 |
| 1,908,789 | Ragan | May 16, 1933 |
| 1,976,258 | Hollingsworth | Oct. 9, 1934 |
| 2,076,028 | Hufferd | Apr. 6, 1937 |
| 2,614,862 | Alldredge et al. | Oct. 21, 1952 |
| 2,652,265 | Booth et al. | Sept. 15, 1953 |
| 2,691,814 | Tait | Oct. 19, 1954 |
| 2,807,486 | Bixby | Sept. 24, 1957 |

FOREIGN PATENTS

| | | |
|---|---|---|
| 648,413 | Great Britain | Jan. 3, 1951 |